United States Patent [19]

Iizuka et al.

[11] Patent Number: 6,049,429
[45] Date of Patent: *Apr. 11, 2000

[54] OPTICAL ELEMENT COMBINATION OPTICAL ELEMENT AND OBSERVATION SYSTEM USING SUCH OPTICAL ELEMENTS

[75] Inventors: Toshimi Iizuka; Toshiki Ishino, both of Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/671,846

[22] Filed: Jun. 28, 1996

[30] Foreign Application Priority Data

Jul. 3, 1995 [JP] Japan .................................. 7-189798
Jun. 25, 1996 [JP] Japan .................................. 7-183955

[51] Int. Cl.[7] .................................................. G02B 27/14
[52] U.S. Cl. ........................... 359/631; 359/632; 359/633
[58] Field of Search ..................... 359/630–633, 359/718, 719

[56] References Cited

U.S. PATENT DOCUMENTS

| | | | |
|---|---|---|---|
| 5,093,567 | 3/1992 | Staveley | 250/221 |
| 5,459,612 | 10/1995 | Ingleton | 359/630 |
| 5,483,307 | 1/1996 | Anderson | 369/630 |
| 5,530,586 | 6/1996 | Yasugaki | 359/630 |
| 5,539,422 | 7/1996 | Heacock et al. | 359/631 |
| 5,543,968 | 8/1996 | Freeman et al. | 359/631 |
| 5,663,833 | 9/1997 | Nanba et al. | 359/633 |
| 5,714,967 | 2/1998 | Okamura et al. | 359/630 |
| 5,739,797 | 4/1998 | Karasawa et al. | 359/630 |
| 5,774,096 | 6/1998 | Usuki et al. | 359/630 |

FOREIGN PATENT DOCUMENTS

| | | |
|---|---|---|
| 57-40201 | 3/1982 | Japan . |
| 61-31290 | 9/1986 | Japan . |

OTHER PUBLICATIONS

S. Yamazaki, et al., "Development of Super Compact HMD With Sight Line Input," Proceedings of 3D Image Conference Jul. 6 and 7, 1995 (and translation), pp. 70–75.

Primary Examiner—Georgia Epps
Assistant Examiner—Evelyn A. Lester
Attorney, Agent, or Firm—Fitzpatrick, Cella, Harper & Scinto

[57] ABSTRACT

An optical element including a first surface, a second surface, and a third surface, at least one of the first surface, the second surface, and the third surface being a curved surface, and at least one of the first surface, the second surface, and the third surface being a reflecting surface. Also included are side surfaces disposed opposite to each other, and positioning members for positioning the optical element, the positioning members being provided on the side surfaces.

68 Claims, 6 Drawing Sheets

OPTICAL ELEMENT COMBINATION OPTICAL ELEMENT AND OBSERVATION SYSTEM USING SUCH OPTICAL ELEMENTS

BACKGROUND OF THE INVENTION

1. Field of the Invention

The present invention relates to a prism element, and to an observation system using the same.

2. Description of the Related Art

Conventionally, a prism element has been used in various types of optical instruments such as telescopes, observation systems and picture taking systems, as one of the optical elements for guiding incident light fluxes in a predetermined direction by reflection and collection.

Generally, in order to obtain good optical properties in an optical instrument using such a prism element, it is necessary to accurately mount the prism in a casing or to another optical member in the optical instrument.

Japanese Utility Model Publication No. 61-31290 discloses a method of mounting a prism element in which a right-angle prism is pressed to a prism sheet using a plate spring and is mounted in a casing. A combination prism constituted by a plurality of prisms is used in a binocular or the like as a roof prism for obtaining a correct image. Such a combination prism is firstly contained in a prism holder and then is pressed by a plate spring or the like so as to be mounted in the casing.

When two prisms are opposingly contained in the casing, they are opposingly disposed with a clearance of about 0.005 to 0.5 mm, and a transparent adhesive is charged into the clearance formed between the opposing surfaces of the prisms to fix both of the prisms.

In addition, a prism element is known that not only deflects incident light fluxes in a predetermined direction, but also wherein the surfaces of the prism element are formed into spherical or aspheric surfaces so as to impart thereto light collective action and image forming action. In such a prism element, it is essential to position the prism accurately so as to be stably mounted in the casing or to another optical member. However, a method of accurately positioning the prism element which includes light corrective action and image forming action has not been known.

SUMMARY OF THE INVENTION

It is an object of the present invention to provide a prism element having light collective action and image forming action which can be accurately positioned on another optical member of an observation system or in a casing of an observation system, and which can easily provide excellent optical properties when used as a part of the observation system for observing image information.

It is another object to provide an observation system using the above prism element.

The optical element of the present invention is shaped like a prism, and is characterized in that it has at least one curved surface or a reflecting surface, and in that positioning sections are provided (a) on side surfaces performing no optical action, or (b) at portions having no influence on optical properties of surfaces performing optical action.

When the optical element of the present invention is manufactured by plastic injection molding, it is preferable to also use part or all of the positioning sections as gates. In addition, the positioning sections may be used as portions against which ejector pins strike, when releasing the optical element from a mold.

According to the combination optical element of the present invention, a first optical element having at least one curved surface, and a second optical element for correcting a prism action, refracting force and various aberration generated by the passage of a light from the outer world through a part of the first optical element are combined and fixed by each other's positioning sections, whereby a see-through observation system of equal magnification can be realized.

By using the optical element and the combination optical element of the present invention in the observation system, they are accurately positioned in the casing and excellent optical properties can be easily obtained.

In view of the foregoing, in one aspect, the present invention relates to an optical element including a first surface, a second surface, and a third surface, at least one of the first surface, the second surface, and the third surface being a curved surface, and at least one of the first surface, the second surface, and the third surface being a reflecting surface, side surfaces disposed opposite to each other, and positioning members for positioning the optical element, the positioning members being provided on the side surfaces.

In another aspect, the present invention relates to an observation system including display means for displaying images, and an optical element having (a) a first surface, (b) a second surface, and (c) a third surface, at least one of the first surface, the second surface, and the third surface being a curved surface, (d) side surfaces disposed opposite to each other, and (e) positioning members for positioning the optical element, the positioning members being provided on the side surfaces, wherein light from the display means passes through the first surface, light passing through the first surface is totally reflected from the second surface, light totally reflected from the second surface is reflected from the third surface, and light reflected from the third surface passes through the second surface.

In yet another aspect, the present invention relates to a combination optical element, including a first optical element including (a) a first surface into which light from a first image enters, (b) a second surface for totally reflecting light passing through the first surface, (c) a third surface for re-reflecting a part of light totally reflected from the second surface to the second surface, at least one of the first surface, the second surface, and the third surface being a curved surface, (d) side surfaces disposed opposite to each other into which light from the first image does not enter, and (e) first positioning members for positioning the first optical element, the first positioning members being provided on the side surfaces, and a second optical element including (a) a fourth surface into which light from a second image enters, (b) a fifth surface which has substantially a same shape as that of the third surface, and into which light from the second image passing through the fourth surface enters, (c) side surfaces disposed opposite to each other into which light from the second image does not enter, and (d) second positioning members for positioning the second optical element, the second positioning members being provided on the side surfaces, wherein the first optical element and the second optical element are positioned by the first positioning members and second positioning members, with the third surface and the fifth surface faced toward each other, and wherein the light from the second image passes through the third surface and the second surface in that order after passing through the fifth surface.

In still another aspect, the present invention relates to an observation system including display means for displaying images, a first optical element including (a) a first surface into which light from the display means enters, (b) a second surface for totally reflecting light passing through the first surface, (c) a third surface for re-reflecting a part of light totally reflected from the second surface to the second surface, at least one of the first surface, the second surface, and the third surface being a curved surface, (d) side surfaces disposed opposite to each other into which the light from the display means does not enter, and (e) first positioning members for positioning the first optical element, the first positioning members being provided on the side surfaces, and a second optical element including (a) a fourth surface into which light from the outer world enters, (b) a fifth surface which has substantially a same shape as that of the third surface, and into which light from the outer world passing through the fourth surface enters, (c) side surfaces disposed opposite to each other into which the light from the outer world does not enter, and (d) second positioning members for positioning the second optical element, the second positioning members being provided on the side surfaces, wherein the first optical element and the second optical element are positioned by the first positioning members and the second positioning members, with the third surface and the fifth surface faced toward each other, and wherein the light from the outer world passes through the third surface and the second surface in that order after passing through the fifth surface.

In yet another aspect, the present invention relates to an optical element, including, a first surface, a second surface, and a third surface, at least one of the first surface, the second surface, and the third surface being a curved surface, and at least one of the first surface, the second surface, and the third surface being a reflecting surface, wherein at least one of the first surface, the second surface, and the third surface includes an optical effective area for effecting an optical action of the respective surface, and positioning members for positioning the optical element, the positioning members being provided at an area of at least one of the first surface, the second surface, and the third surface other than the optical effective area of the respective surface.

In another aspect, the present invention relates to an observation system, including display means for displaying images, an optical element having (a) a first surface, (b) a second surface, and (c) a third surface, at least one of the first surface, the second surface, and the third surface being a curved surface, wherein at least one of the first surface, the second surface, and the third surface includes an optical effective area for effecting an optical action of the respective surface, and (d) positioning members for positioning the optical element, the positioning members being provided at an area of at least one of the first surface, the second surface, and the third surface other than the optical effective area of the respective surface, wherein light from the display means passes through the first surface, light passing through the first surface is totally reflected from the second surface, light totally reflected from the second surface is reflected from the third surface, and light reflected from the third surface passes through the second surface.

The present invention relates in yet another aspect to a combination optical element including a first optical element including (a) a first surface into which light from a first image enters, (b) a second surface for totally reflecting light passing through the first surface, (c) a third surface for re-reflecting a part of light totally reflected from the second surface to the second surface at least one of the first surface, the second surface, and the third surface being a curved surface, wherein at least one of the first surface, the second surface, and the third surface includes an optical effective area for effecting an optical action of the respective surface, and (d) first positioning members for positioning the first optical element, the first positioning members being provided at areas of at least one of the first surface, the second surface, and the third surface other than the optical effective area of the respective surface, and a second optical element including (a) a fourth surface into which light from a second image enters, (b) a fifth surface which has substantially a same shape as that of the third surface, and into which light from the second image passing through the fourth surface enters, wherein the fifth surface has an optical effective area for effecting an optical action of the fifth surface, and (c) second positioning members for positioning the second optical element, the second positioning members being provided at ares of the fifth surface other than the optical effective area of the fifth surface, wherein the first optical element and the second optical element are positioned by the first positioning members and the second positioning members, with the third surface and the fifth surface faced toward each other, and wherein the light from the second image passes through the third surface and the second surface in that order after passing through the fifth surface.

In addition, in another aspect, the present invention relates to an observation system including display means for displaying an image, a first optical element including (a) a first surface into which light from the display means enters, (b) a second surface for totally reflecting light passing through the first surface, (c) a third surface for re-reflecting a part of light totally reflected from the second surface to the second surface, at least one of the first surface, the second surface, and the third surface being a curved surface, wherein the third surface has an optical effective area for effecting an optical action of the third surface, and (d) first positioning members for positioning the fist optical element, the first positioning members being provided at areas of the third surface other than the optical effective area of the third surface, and a second optical element including (a) a fourth surface into which light from the outer world enters, (b) a fifth surface which has substantially a same shape as that of the third surface, and into which the light from the outer world passing through the fourth surface enters, wherein the fifth surface has an optical effective area for effecting an optical action of the fifth surface, and (c) second positioning members for positioning the second optical element, the second positioning members being provided at areas of the fifth surface other than the optical effective area of the fifth surface, wherein the first optical element and the second optical element are positioned by the first positioning members and the second positioning members with the third surface and the fifth surface faced toward each other, and wherein the light from the outer world passes through the third surface and the second surface in that order after passing through the fifth surface.

In yet another aspect, the present invention relates to a prism element for use in an observation system, the prism element including an upper surface through which light incident upon the prism element passes, a front surface for totally reflecting light which has passed through the upper surface, a rear surface for reflecting light which has been totally reflected by the second surface, wherein light reflected from the rear surface passes through the front surface, an opposing pair of side surfaces, neither of which perform optical actions on light passing through the prism element, and positioning members for positioning the prism element in the observation system, the positioning members being provided on the side surfaces.

In still anther aspect, the present invention relates to a prism element, including an upper surface through which light incident upon the prism element passes, a front surface for totally reflecting light which has passed through the upper surface, a rear surface for reflecting light which has been totally reflected by the second surface, wherein light reflected from the rear surface passes through the front surface, and wherein the rear surface includes an optical effective area which performs optical actions of the rear surface, an opposing pair of side surfaces, neither of which perform optical actions on light passing through the prism element, and at least one positioning member for positioning the prism element, the at least one positioning member being disposed at the rear surface in an area other than in the optical effective area of the rear surface.

The above and other aspects, objects, features, and advantages of the present invention will become clear from the following description of the preferred embodiments when the same is read in conjunction with the accompanying drawings.

DETAILED DESCRIPTION OF THE PREFERRED EMBODIMENTS

Figure 1:
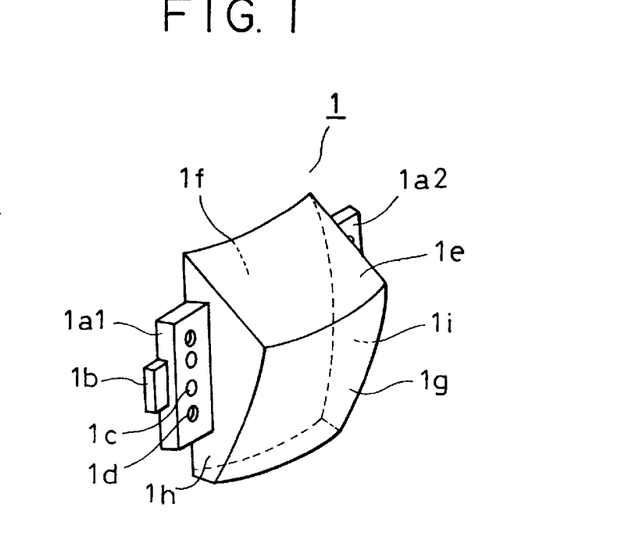
FIG. 1 is a perspective view which illustrates a main part of a prism element according to a first embodiment of the present invention.
Figure 2:
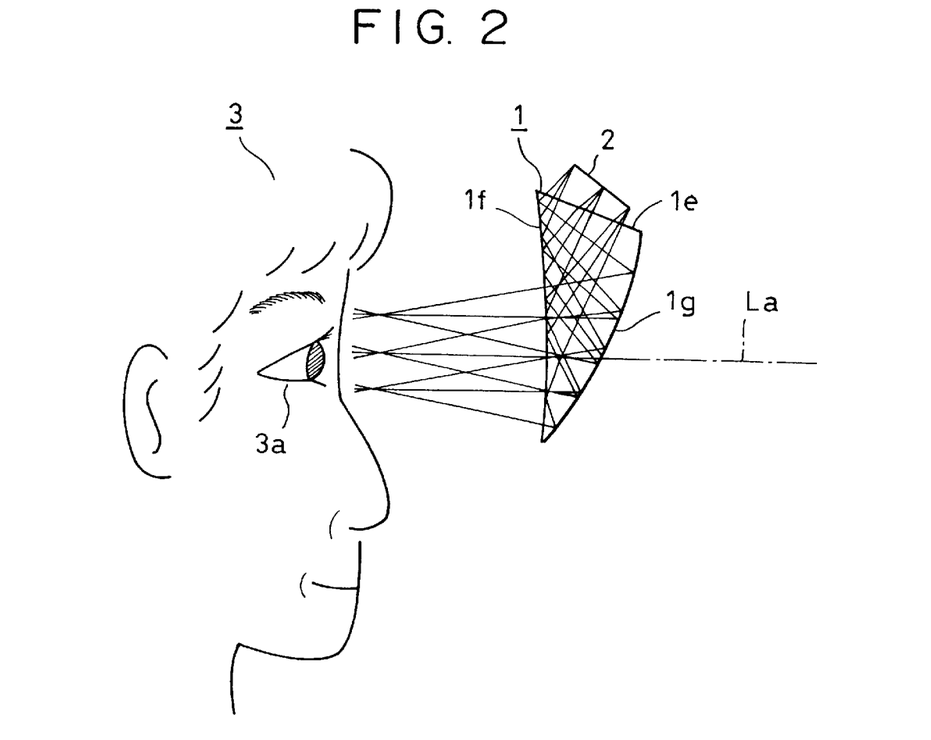
FIG. 2 schematically illustrates a main part of an observation system using the prism element of FIG. 1.

FIG. 1 is a perspective view which illustrates a main part of a prism element according to a first embodiment, and FIG. 2 schematically illustrates an observation system using the prism element of FIG. 1.

Referring to FIG. 1, a prism element 1 is manufactured by plastic-molding. The prism 1 includes three surfaces 1e, 1f and 1g which perform optical actions (reflection and refraction) as a whole, and two side surfaces 1h and 1i which do not perform optical actions. An upper surface (first surface) 1e is a light incident surface constituted by a plane surface or a curved surface such as a spherical or an aspheric surface. A front surface (second surface) 1f is constituted by a spherical surface or a toric surface which serves as a reflecting or refracting surface using total reflection partially thereon. A rear surface (third surface) 1g is constituted by a rotary asymmetrical aspheric surface having a curvature which varies in accordance with azimuth angles of semi-transparent or mirror surface reflection, i.e., a surface having a shape symmetrical with respect to one plane of symmetry.

In this embodiment, since the front surface 1f and the rear surface 1g are not co-axial with respect to a center axis (center axis of an eyeball 3a) La (FIG. 2), eccentric aberration is generated. Therefore, the eccentric aberration is corrected by forming the rear surface 1g into a rotary asymmetrical aspheric surface. Projections (positioning sections) 1a1 and 1a2 are provided on the side surfaces 1h and 1i, respectively.

Since the prism element 1 of this embodiment has a narrow plane as a reference plane, the prism element 1 is positioned with respect to other members in an observation system using the projections 1a1 and 1a2 provided on the side surfaces 1h and 1i, so that the prism element 1 is disposed at a predetermined position in the casing of the observation system. Referring to FIG. 1, gates 1b are provided on the side surfaces of the projections 1a1 and 1a2, ejector pin marks 1c are formed in the projections 1a1 and 1a2, and positioning holes id are provided in the projections 1a1 and 1a2.

In this embodiment, the positioning holes 1d provided in the projections 1a1 and 1a2 are used when fixing the prism element 1 to another member in the casing, so that the prism element 1 is positioned and held with high accuracy without an adverse effect such as distortion or the like on the optical active surfaces 1e, 1f and 1g.

In addition, according to this embodiment, since the gates 1b are provided on the projections 1a1 and 1a2 when the prism element 1 is manufactured by plastic injection molding, plastic materials can be uniformly charged into a mold.

Further, since a molded article (prism element 1) is released by pushing out projections 1a1 and 1a2 with ejector pins, no adverse effect such as distortion or the like is exerted on the optical active surfaces 1e, 1f and 1g.

The positioning sections may be fixed by fitting projections of other members thereinto, without being projected as described in this embodiment. This may be similarly applied to the embodiments described below.

A construction will now be described in which the prism element 1 of this embodiment is used in a part of the observation system shown in FIG. 2. In FIG. 2, the projections 1a1 and 1a2 provided on the prism element 1 are not shown. Referring to FIG. 2, there is shown an observer 3, and there is provided a display means 2 constituted by, for example, a liquid crystal device which displays image information of the visible region. The display means 2 displays image information based on signals from an image information supply means (not shown) such as a CD-ROM or a video camera.

In this embodiment, light fluxes (visible light fluxes) based on the image information displayed by the display means 2 are introduced into the prism element 1 from its light incident upper surface 1e. The light fluxes are totally reflected from the front surface 1f of the prism element 1 and then are reflected from and collected at the rear surface 1g to be passed through the front surface 1f so that they are guided to the eyeball (eye point) 3a of the observer 3. At this time, by properly setting curvatures (shapes) of the front surface 1f and the rear surface 1g, a virtual image of the image information is displayed in front of the observer 3 without a mid-course image forming of the image information displayed on the display means 2, i.e., without providing a primary image forming surface.

Thus, according to this embodiment, the prism element 1 is used in a part of the observation system so that the observer 3 observes the virtual image of the image information.

Figure 3:
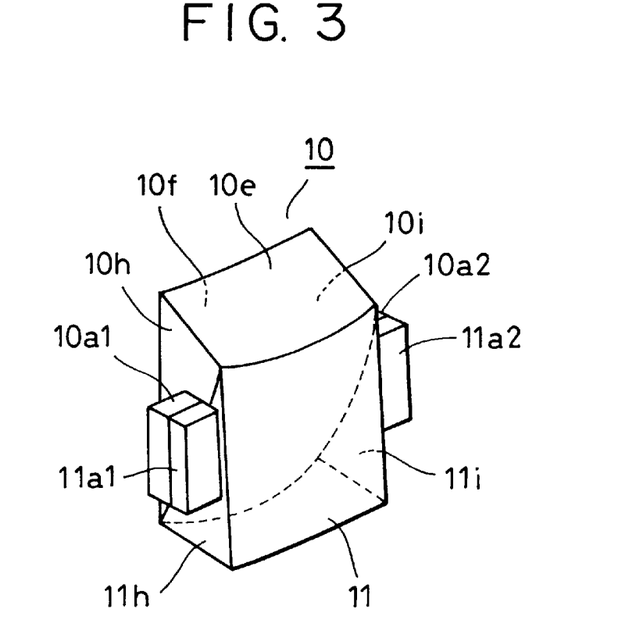
FIG. 3 is a perspective view which illustrates a main part of a combination prism according to a second embodiment of the present invention.
Figure 4:
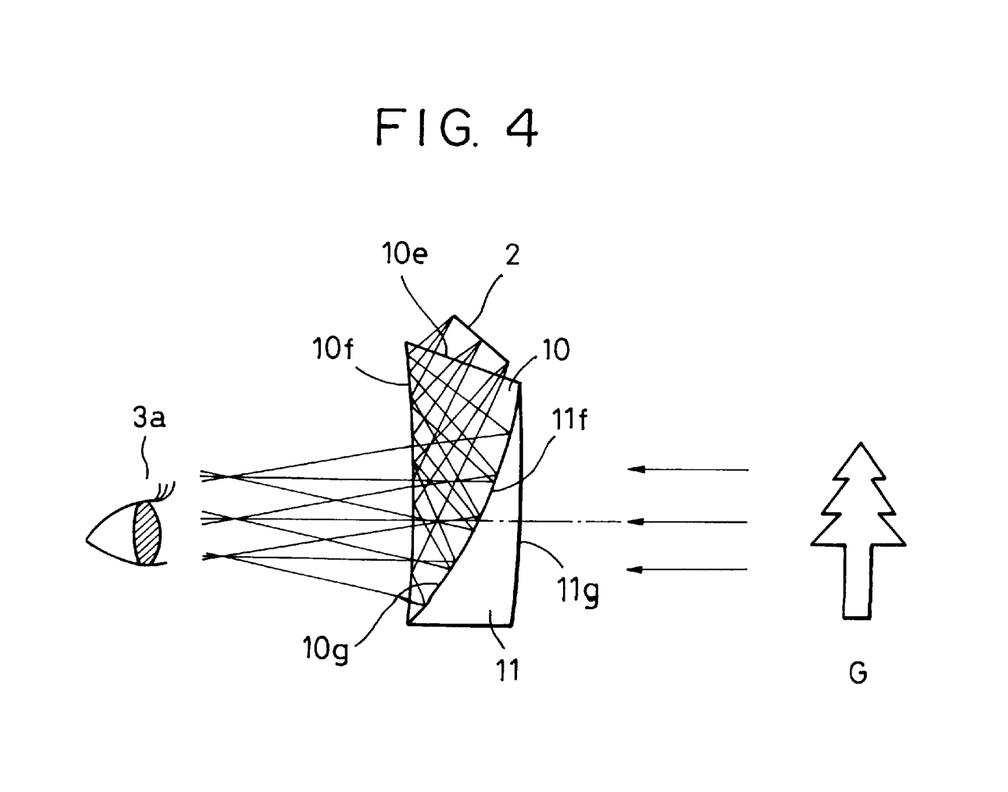
FIG. 4 schematically illustrates a main part of an observation system using the combination prism of FIG. 3.

FIG. 3 is a perspective view which illustrates a main part of a second embodiment in which a prism element 10 and a second prism element 11 are combined as a combination prism. FIG. 4 schematically illustrates a main part of an observation system using the combination prism shown in FIG. 3.

An upper surface 10e, front surface 10f, and rear surface 10g of the first prism element 10 shown in FIGS. 3 and 4 correspond to the upper surface 1e, front surface 1f and rear surface 1g of the prism element 1 shown in FIGS. 1 and 2. The second prism element 11 includes a light transmission surface 11f having a shape which is substantially the same as that of the rear surface 10g of the first prism 10, a transparent light incident surface 11g constituted by a rotary asymmetrical aspheric surface, and opposing side surfaces 11h and 11i which do not perform optical actions.

Referring to FIG. 3, first projections 10a1 and 10a2 are provided on the side surfaces (which do not perform optical actions) 10h and 10i, respectively, of the first prism element 10, and second projections 11a1 and 11a2 are provided on the side surfaces 11h and 11i, respectively, of the second prism element 11. The two prism elements 10 and 11 are positioned and fixed by using the first and second projections 10a1, 10a2 and 11a1, 11a2. The rear surface 10g of the first prism element 10 and the curved surface 11f of the second prism element 11 are fixed with a clearance of about 0.005 to 0.5 mm formed therebetween.

An adhesive having substantially the same refractive index as that of the first and second prism elements is charged into the clearance. If the adhesive is charged, the surface 11f may be a suitable one without being completely matched with the surface 10g in shape. The positioning of the first and second prism elements 10 and 11 in the direction of rotation around the center axis is performed by holes and pins (not shown) provided at the portions of the observation system to which the first and second projections 10a1, 10a2 and 11a1, 11a2 are fitted.

According to the observation system of this embodiment shown in FIG. 4, the image information displayed on the display means 2 is guided to the eye point 3a through the first prism element 10, and image information G such as such as scenery of the outer world is guided to the eye point 3a through the second prism element 11 and the first prism element 10. That is, the observation system of this embodiment is suitable for a spectacles-type observation system in which two images are spatially superimposed to be observed in the same visual field.

The observation system of FIG. 4 will be described in detail. In FIG. 4, the first and second projections 10a1, 10a2 and 11a1, 11a2 provided on the first and second prism elements are not shown. In the observation system of FIG. 4, the light fluxes based on the image information displayed on the display means 2 enter from the upper surface 10e of the first prism element 10, are totally reflected from a portion of the front surface 10f, are partially reflected from the rear surface 10g on which a half mirror is formed, and are emitted from the front surface 10f, as in the case of the observation system shown in FIG. 2.

In this embodiment, an optical path for observation of the image information displayed on the display means 2 at the eye point 3a is the same as that of the embodiment shown in FIG. 2.

The light fluxes from the image information G such as scenery of the outer world enter from the surface 11g of the second prism element 11 to the eye point 3a through the curved surfaces 11f and 10g, and through the front surface 10f, whereby the image information displayed on the display means 2 and the image information G of the outer world are spatially superimposed to be observed in the same visual field.

According to the observation system of this embodiment, prism actions, various aberrations and refracting force generated by the passage of the light fluxes from the outer world through the rear surface 10g and the front surface 10f of the first prism element 10 are corrected by the second prism element 11 itself. Particularly, the aberrations and refracting force are corrected by the surface 11g to realize a see-through observation system of equal magnification.

Figure 5:
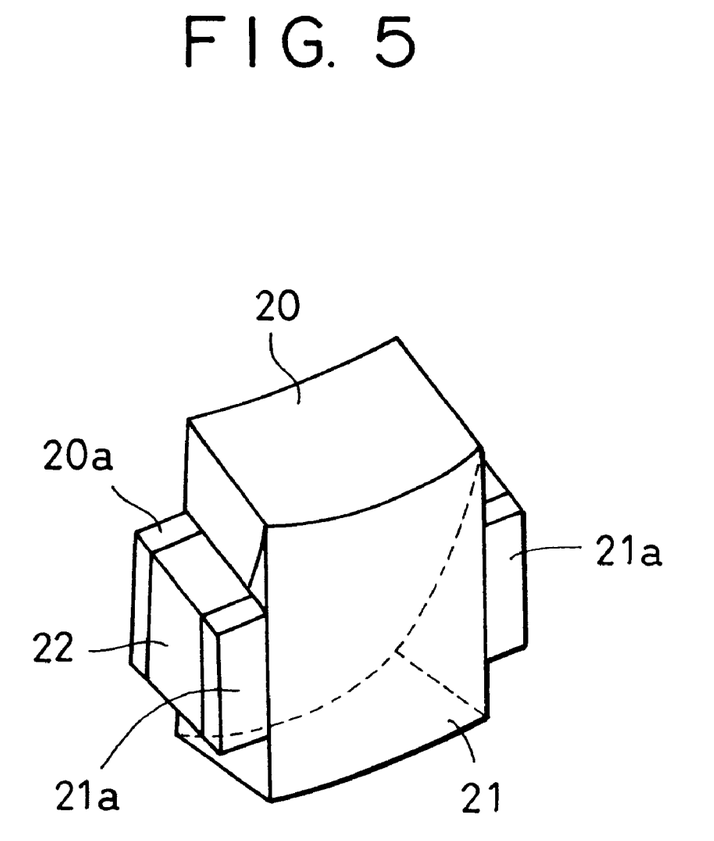
FIG. 5 is a perspective view which illustrates a main part of the combination prism in another form.

FIG. 5 is a perspective view which illustrates a main part of the combination prism in another form. The form of the combination prism shown in FIG. 5 differs from that of shown in FIG. 3 in that spacers 22 are sandwiched between first projections 20a of a first prism element 20 and second projections 21a of a second prism element 21 to fix the first and second projections 20a and 21a, so that the first prism element 20 and the second prism element 21 are combined. The other constructions of the combination prism in the form shown in FIG. 5 are the same as those of the combination prism in the form shown in FIG. 3.

Figure 6:
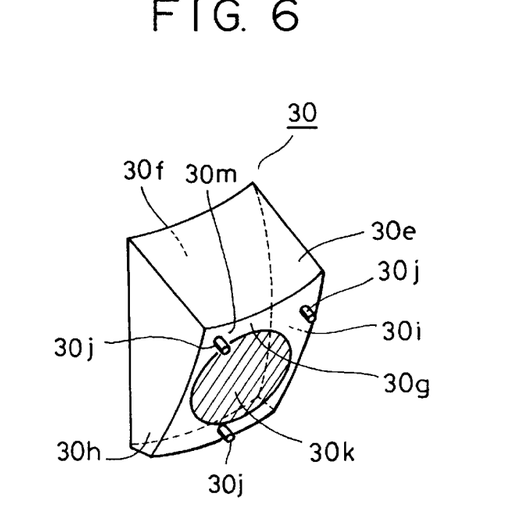
FIG. 6 is a perspective view which illustrates a main part of a prism element according to a third embodiment of the present invention.
Figure 7:
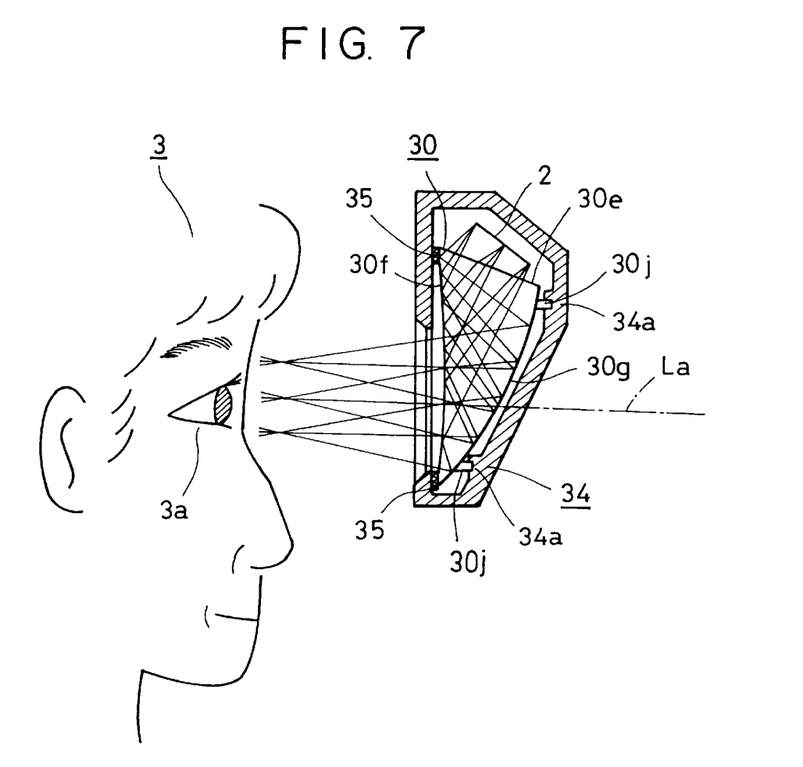
FIG. 7 schematically illustrates a main part of an observation system using the prism element of FIG. 6.

FIG. 6 is a perspective view which illustrates a main part of a prism element according to a third embodiment, and FIG. 7 schematically illustrates a main part of an observation system using the prism element shown in FIG. 6.

Since the functions of the optical active surfaces (the upper surface 30e, front surface 30f and rear surface 30g) of this embodiment are the same as those of the first embodiment (surfaces 1e, 1f, and 1g, respectively), an explanation thereof has been omitted. This embodiment differs from the first embodiment in that positioning projections 30j are provided on portions of the rear surface 30g other than an effective section 30k which performs optical actions. As noted above, "optical action" refers to light collection, image forming, reflection, and/or refraction. Also depicted in FIG. 6 is area 30m which is the area of rear surface 30g other than (i.e., excluding) the effective section 30k. As is apparent from the foregoing, area 30m has less of an effect upon the optical action of rear surface 30g than does effective section 30k. Positioning of the prism element 30 to another member in the observation system is performed by using the projections 30j. As the projections 30j, gates may be used which are formed when manufacturing the prism element 30 by plastic injection molding. This may be similarly applied to the embodiments described below.

A construction will now be described in which the prism element of this embodiment is used in a part of the observation system shown in FIG. 7.

In this embodiment, an optical path for observation of the image information displayed on the display means 2 at the eye point 3a is the same as that of the first embodiment shown in FIG. 2.

A distinctive construction of this embodiment is that projections 30j of the prism element 30 are fitted into positioning holes 34a formed inside of a casing 34 containing the prism element 30 and the display means 2, so as to perform positioning of the prism element 30. At this time, the prism element 30 is urged by elastic members 35 toward the positioning holes 34a with a degree of force which does not deform the prism element 30. In this embodiment, a relation between the positioning holes 34a and the projections 30j may be reversed, i.e., the positioning holes 34a may be provided on the side of the prism element 30.

Figure 8:
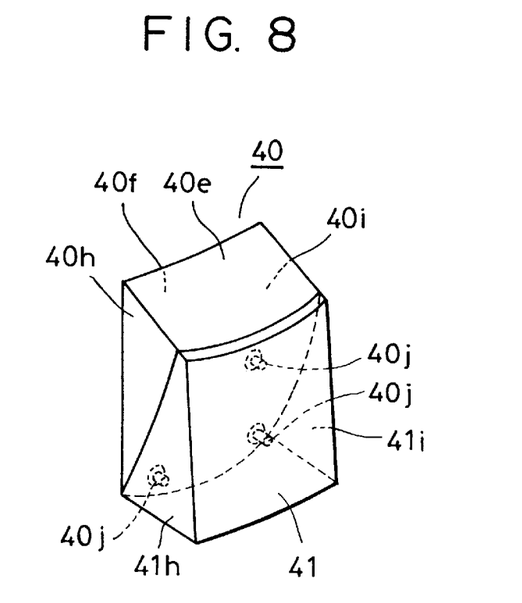
FIG. 8 is a perspective view which illustrates a main part of a combination prism according to a fourth embodiment of the present invention.
Figure 9:
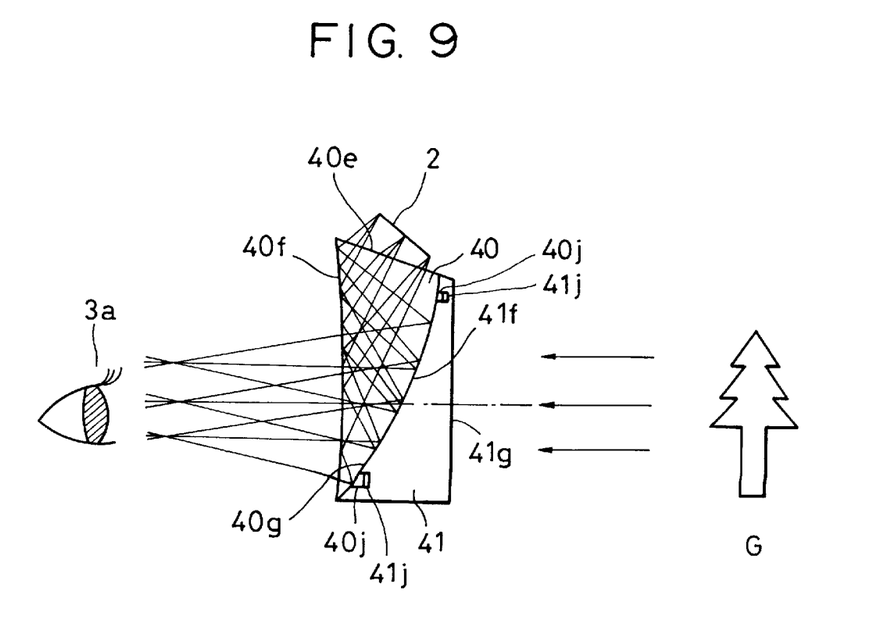
FIG. 9 schematically illustrates a main part of an observation system using the combination prism of FIG. 8.

FIG. 8 is a perspective view which illustrates a main part of a fourth embodiment in which a prism element 40 and a second prism element 41 are combined in a combination prism, and FIG. 9 schematically illustrates a main part of an observation system using the combination prism shown in FIG. 8.

Referring to FIGS. 8 and 9, a rear surface 40g of a first prism element 40 and a curved surface 41f of a second prism 41 of substantially the same shape are combined by means of projections 40j from first prism element 40 and holes 41j in second prism element 41 so as to perform positioning of first and second prism elements 40 and 41. The rear surface 40g and the curved surface 41f are disposed with a clearance of about 0.005 to 0.5 mm formed therebetween.

An adhesive having substantially the same refractive index as that of the first and second prism elements 40 and 41 is charged into the clearance. If the adhesive is charged, the surface 41f may be a suitable one without being completely matched with the surface 40g in shape.

The observation system of this embodiment is suitable for a spectacles-type observation system in which the image information from the display means 2 and the image information G from the outer world are spatially superimposed to be observed in the same visual field, as in the case of the second embodiment shown in FIG. 4.

Figure 10:
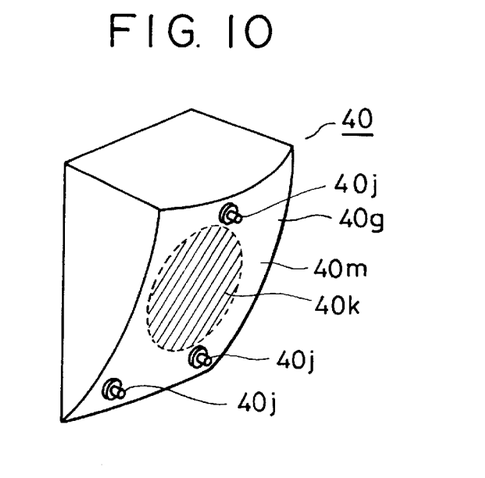
FIG. 10 is a perspective view which illustrates a main part of a first prism element of FIG. 8.
Figure 11:
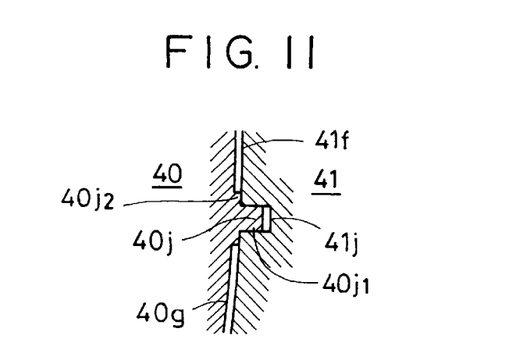
FIG. 11 is an enlarged sectional view which illustrates a positioning section of the combination prism of FIG. 8.

FIG. 10 is a perspective view showing a main part of the first prism element 40 shown in FIG. 8, and FIG. 11 is a sectional view showing only a positioning section of the first and second prism elements 40 and 41.

In this embodiment, each of the projections 40j are of a two-stage construction. Thus, small diameter portions 40j1 of the projections 40j are fitted into the positioning hole 41j of the second prism element 41 to perform positioning, and large diameter portions 40j2 of the projections 40j abut against the curved surface 41f of the second prism element 41, so that a predetermined clearance can be formed between the rear surface 40g and the curved surface 41f. Three projections 40j are shown in FIG. 10.

Effective area 40k and area 40m of surface 40g in FIG. 10 are analogous to effective area 30k and area 30m, respectively, as depicted in FIG. 6.

Figure 12:
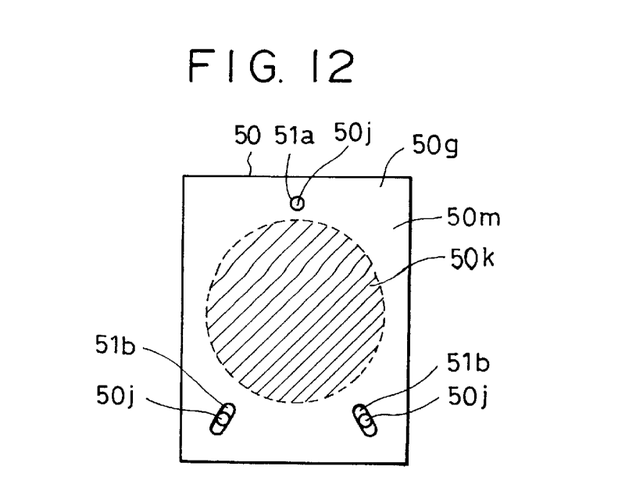
FIG. 12 illustrates positioning of the prism element and another member according to a fifth embodiment of the present invention.

FIG. 12 illustrates a prism element 50 viewed from a rear surface 50g according to a fifth embodiment which has the same shape as that of the prism element 40 shown in FIG. 10.

This embodiment shows an example of a case in which positioning is performed between the prism element 50 and another member in the observation system, the other member having a thermal expansion coefficient which is different from that of the prism element 50.

Effective area 50k and area 50m of surface 50g in FIG. 12 are analogous to effective area 30k and area 30m, respectively, as depicted in FIG. 6.

In this embodiment, one hole 51a and two slots 51b are provided in the other member (not shown). As shown in FIG. 12, three corresponding projections 50j are provided in the prism element 50. In such a construction, the prism element 50 and the other member are positioned by projections 50j, the hole 51a, and the slots 51b. In addition, when both of the prism element 50 and the other member undergo thermal deformation, the influence of thermal deformation can be absorbed because there is a degree of freedom along the direction of the length of the slots 51b. Alternatively, the projections 50j may be provided on the other member, and the positioning hole 50a and the slots 51b may be provided in the prism element 50.

According to the first to fifth embodiments as described above, only a rear surface included in the prism element (1, 10, 20, 30, 40 and 50) is constituted by a rotary asymmetrical aspheric surface. However, the surfaces other than the rear surface, or a plurality of surfaces may be constituted by the rotary asymmetrical aspheric surfaces. Particularly, by forming all of the surfaces of the prism element into a rotary asymmetrical aspheric shape, various aberrations can be corrected more excellently.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical element, comprising:
   a first surface;
   a second surface;
   a third surface, at least one of said first surface, said second surface, and said third surface being a curved surface which is a rotary asymmetrical aspheric surface, and at least one of said first surface, said second surface, and said third surface being a reflecting surface;
   side surfaces disposed opposite to each other; and
   positioning portions for positioning said optical element, said positioning portions being provided on said side surfaces.

2. An optical element according to claim 1, wherein each said curved surface is symmetrical with respect to only one plane of symmetry.

3. An optical element according to claim 1, wherein light from an image passes through said first surface, light passing through said first surface is totally reflected from said second surface, light totally reflected from said second surface is reflected from said third surface, and light reflected from said third surface passes through said second surface.

4. An optical element according to claim 1, wherein said positioning portions comprise gates which are formed at a time of injection molding of said optical element.

5. An optical element according to claim 1, wherein said positioning portions comprise portions against which ejector pins strike, and which are formed at a time of injection molding of said optical element.

6. An observation system, comprising:
   display means for displaying images; and
   an optical element having (a) a first surface, (b) a second surface, and (c) a third surface, at least one of said first surface, said second surface, and said third surface being a curved surface which is a rotary asymmetrical aspheric surface, (d) side surfaces disposed opposite to each other, and (e) positioning portions for positioning said optical element, said positioning portions being provided on said side surfaces, wherein light from said display means passes through said first surface, light passing through said first surface is totally reflected from said second surface, light totally reflected from said second surface is reflected from said third surface, and light reflected from said third surface passes through said second surface.

7. An observation system according to claim 6, wherein each said curved surface is symmetrical with respect to only one plane of symmetry.

8. A combination optical element, comprising:

a first optical element including (a) a first surface into which light from a first image enters, (b) a second surface for totally reflecting light passing through said first surface, (c) a third surface for re-reflecting a part of light totally reflected from said second surface to said second surface, at least one of said first surface, said second surface, and said third surface being a curved surface which is a rotary asymmetrical aspheric surface, (d) side surfaces disposed opposite to each other into which light from the first image does not enter, and (e) first positioning portions for positioning said first optical element, said first positioning portions being provided on said side surfaces; and a second optical element including (a) a fourth surface into which light from a second image enters, (b) a fifth surface which has substantially a same shape as that of said third surface, and into which light from the second image passing through said fourth surface enters, (c) side surfaces disposed opposite to each other into which light from the second image does not enter, and (d) second positioning portions for positioning said second optical element, said second positioning portions being provided on said side surfaces, wherein said first optical element and said second optical element are positioned by said first positioning portions and second positioning portions, with said third surface and said fifth surface faced toward each other, and wherein the light from the second image passes through said third surface and said second surface in that order after passing through said fifth surface.

9. A combination optical element according to claim 8, wherein each said curved surface is symmetrical with respect to only one plane of symmetry.

10. A combination optical element according to claim 8, wherein said third surface and said fifth surface are positioned a predetermined distance apart from each other.

11. A combination optical element according to claim 10, further comprising an adhesive disposed in a clearance formed between said third surface and said fifth surface.

12. A combination optical element according to claim 8, further comprising spacers sandwiched between said first positioning portions and said second positioning portions.

13. An observation system, comprising:

display means for displaying images;

a first optical element including (a) a first surface into which light from said display means enters, (b) a second surface for totally reflecting light passing through said first surface, (c) a third surface for re-reflecting a part of light totally reflected from said second surface to said second surface, at least one of said first surface, said second surface, and said third surface being a curved surface which is a rotary asymmetrical aspheric surface, (d) side surfaces disposed opposite to each other into which the light from said display means does not enter, and (e) first positioning portions for positioning said first optical element, said first positioning portions being provided on said side surfaces; and a second optical element including (a) a fourth surface into which light from the outer world enters, (b) a fifth surface which has substantially a same shape as that of said third surface, and into which light from the outer world passing through said fourth surface enters, (c) side surfaces disposed opposite to each other into which the light from the outer world does not enter, and (d) second positioning portions for positioning said second optical element, said second positioning portions being provided on said side surfaces, wherein said first optical element and said second optical element are positioned by said first positioning portions and said second positioning portions, with said third surface and said fifth surface faced toward each other, and wherein the light from the outer world passes through said third surface and said second surface in that order after passing through said fifth surface.

14. An observation system according to claim 13, wherein each said curved surface is symmetrical with respect to only one plane of symmetry.

15. An optical element, comprising:

a first surface;

a second surface;

a third surface, at least one of said first surface, said second surface, and said third surface being a curved surface which is a rotary asymmetrical aspheric surface, and at least one of said first surface, said second surface, and said third surface being a reflecting surface, wherein at least one of said first surface, said second surface, and said third surface includes an optical effective area for effecting an optical action of the respective surface; and positioning portions for positioning said optical element, said positioning portions being provided at an area of at least one of said first surface, said second surface, and said third surface other than the optical effective area of the respective surface.

16. An optical element according to claim 15, wherein each said curved surface is symmetrical with respect to only one plane of symmetry.

17. An optical element according to claim 15, wherein light from an image passes through said first surface, light passing through said first surface is totally reflected from said second surface, light totally reflected from said second surface is reflected from said third surface, and light reflected from said third surface passes through said second surface.

18. An optical element according to claim 15, wherein said positioning portions comprise gates which are formed at a time of injection molding of said optical element.

19. An observation system, comprising:

display means for displaying images;

an optical element having (a) a first surface, (b) a second surface, and (c) a third surface, at least one of said first surface, said second surface, and said third surface being a curved surface which is a rotary asymmetrical aspheric surface, wherein at least one of said first surface, said second surface, and said third surface includes an optical effective area for effecting an optical action of the respective surface, and (d) positioning portions for positioning said optical element, said positioning portions being provided at an area of at least one of said first surface, said second surface, and said third surface other than the optical effective area of the respective surface, wherein light from said display means passes through said first surface, light passing through said first surface is totally reflected from said second surface, light totally reflected from said second surface is reflected from said third surface, and light reflected from said third surface passes through said second surface.

20. An observation system according to claim 19, wherein each said curved surface is symmetrical with respect to only one plane of symmetry.

21. A combination optical element, comprising:

a first optical element including (a) a first surface into which light from a first image enters, (b) a second surface for totally reflecting light passing through said first surface, (c) a third surface for re-reflecting a part of light totally reflected from said second surface to said second surface, at least one of said first surface, said second surface, and said third surface being a curved surface which is a rotary asymmetrical aspheric surface, wherein at least one of said first surface, said second surface, and said third surface includes an optical effective area for effecting an optical action of the respective surface, and (d) first positioning portions for positioning said first optical element, said first positioning portions being provided at areas of at least one of said first surface, said second surface, and said third surface other than the optical effective area of the respective surface; and a second optical element including (a) a fourth surface into which light from a second image enters, (b) a fifth surface which has substantially a same shape as that of said third surface, and into which light from the second image passing through said fourth surface enters, wherein said fifth surface has an optical effective area for effecting an optical action of said fifth surface, and (c) second positioning portions for positioning said second optical element, said second positioning portions provided at areas of said fifth surface other than the optical effective area of said fifth surface, wherein said first optical element and said second optical element are positioned by said first positioning portions and said second positioning portions, with said third surface and said fifth surface faced toward each other, and wherein the light from the second image passes through said third surface and said second surface in that order after passing through said fifth surface.

22. A combination optical element according to claim 21, wherein each said curved surface is symmetrical with respect to only one plane of symmetry.

23. A combination optical element according to claim 21, wherein said third surface and said fifth surface are positioned a predetermined distance apart from each other.

24. A combination optical element according to claim 23, further comprising an adhesive disposed in a clearance formed between said third surface and said fifth surface.

25. A combination optical element according to claim 21, wherein said first positioning portions include a projection extending from said third surface.

26. A combination optical element according to claim 25, wherein said second positioning portions include a positioning portion formed as a positioning hole in said fifth surface.

27. A combination optical element according to claim 26, wherein said projection extending from said third surface is configured to be inserted into said positioning hole in said fifth surface.

28. A combination optical element according to claim 27, wherein said projection includes a first projection member having a first diameter, and a second projection member having a second diameter smaller than the first diameter.

29. A combination optical element according to claim 28, wherein said second projection member is configured to be inserted into said positioning hole in said fifth surface, and wherein said first projection member is configured to be greater in diameter than said positioning hole so that said first projection member abuts said fifth surface of said second optical element, thereby positioning said third surface and said fifth surface apart by a predetermined distance.

30. A combination optical element according to claim 21, wherein said second positioning portions include a projection.

31. An observation system, comprising:

display means for displaying an image;

a first optical element including (a) a first surface into which light from said display means enters, (b) a second surface for totally reflecting light passing through said first surface, (c) a third surface for re-reflecting a part of light totally reflected from said second surface to said second surface, at least one of said first surface, said second surface, and said third surface being a curved surface which is a rotary asymmetrical aspheric surface, wherein said third surface has an optical effective area for effecting an optical action of said third surface, and (d) first positioning portions for positioning said first optical element, said first positioning portions being provided at areas of said third surface other than the optical effective area of said third surface; and a second optical element including (a) a fourth surface into which light from the outer world enters, (b) a fifth surface which has substantially a same shape as that of said third surface, and into which the light from the outer world passing through said fourth surface enters, wherein said fifth surface has an optical effective area for effecting an optical action of said fifth surface, and (c) second positioning portions for positioning said second optical element, said second positioning portions being provided at areas of said fifth surface other than the optical effective area of said fifth surface, wherein said first optical element and said second optical element are positioned by said first positioning portions and said second positioning portions with said third surface and said fifth surface faced toward each other, and wherein the light from the outer world passes through said third surface and said second surface in that order after passing through said fifth surface.

32. An observation system according to claim 31, wherein each said curved surface is symmetrical with respect to only one plane of symmetry.

33. A prism element for use in an observation system, said prism element comprising:

an upper surface through which light incident upon said prism element passes;

a front surface for totally reflecting light which has passed through said upper surface;

a rear surface for reflecting light which has been totally reflected by said front surface, wherein light reflected from said rear surface passes through said front surface, and wherein said rear surface is a rotary asymmetrical aspherical surface;

an opposing pair of side surfaces, neither of which perform optical actions on light passing through said prism element; and positioning portions for positioning said prism element in the observation system, said positioning portions being provided on said side surfaces.

34. A prism element according to claim 33, wherein said upper surface is a curved surface.

35. A prism element according to claim 34, wherein said curved surface is an aspherical surface.

36. A prism element according to claim 33, wherein said front surface is a spherical surface.

37. A prism element according to claim 33, wherein said front surface is a toric surface.

38. A prism element according to claim 33, wherein each of said upper surface, said front surface, and said rear surface is a rotary asymmetrical aspheric surface.

39. A prism element according to claim 33, wherein said rear surface is an aspheric surface having a curvature which varies in accordance with azimuth angles of semi-transparent or mirror surface reflection.

40. A prism element according to claim 33, wherein said positioning portions comprise a projection.

41. A prism element according to claim 33 wherein said positioning portions comprise a positioning portion formed as a positioning hole.

42. A prism element, comprising:

an upper surface through which light incident upon said prism element passes;

a front surface for totally reflecting light which has passed through said upper surface;

a rear surface for reflecting light which has been totally reflected by said front surface, wherein light reflected from said rear surface passes through said front surface, wherein said rear surface is a rotary asymmetrical aspherical surface, and wherein said rear surface includes an optical, effective area which performs optical actions of said rear surface;

an opposing pair of side surfaces, neither of which perform optical actions on light passing through said prism element; and at least one positioning portion for positioning said prism element, said at least one positioning portion being disposed at said rear surface in an area other than in the optical effective area of said rear surface.

43. A prism element according to claim 42, comprising a plurality of said positioning portions.

44. A prism element according to claim 42, wherein said at least one positioning portion includes a projection.

45. A prism element according to claim 42, wherein said at least one positioning portion includes a positioning portion formed as a hole.

46. A prism element according to claim 42, wherein said at least one positioning portion includes a positioning portion formed as a slot.

47. A prism element according to claim 42, wherein at least one said positioning portion is formed as a hole and at least one said positioning portion is formed as a slot.

48. A prism element according to claim 42, wherein said at least one positioning portion is disposed at said rear surface in an area having less effect upon optical actions of said rear surface than the optical effective area of said rear surface.

49. A combination optical element, comprising:

a first optical element including (a) a first surface into which light from a first image enters, (b) a second surface for totally reflecting light passing through said first surface, (c) a third surface for re-reflecting a part of light totally reflected from said second surface to said second surface, at least one of said first surface, said second surface, and said third surface being a curved surface, (d) side surfaces disposed opposite to each other into which light from the first image does not enter, and (e) first positioning portions for positioning said first optical element, said first positioning portions being provided on said side surfaces; and a second optical element including (a) a fourth surface into which light from a second image enters, said fourth surface being a rotary asymmetrical aspherical surface, (b) a fifth surface which has substantially a same shape as that of said third surface, and into which light from the second image passing through said fourth surface enters, (c) side surfaces disposed opposite to each other into which light from the second image does not enter, and (d) second positioning portions for positioning said second optical element, said second positioning portions being provided on said side surfaces, wherein said first optical element and said second optical element are positioned by said first positioning portions and second positioning portions, with said third surface and said fifth surface faced toward each other, and wherein the light from the second image passes through said third surface and said second surface in that order after passing through said fifth surface.

50. An observation system, comprising:

display means for displaying images;

a first optical element including (a) a first surface into which light from said display means enters, (b) a second surface for totally reflecting light passing through said first surface, (c) a third surface for re-reflecting a part of light totally reflected from said second surface to said second surface, at least one of said first surface, said second surface, and said third surface being a curved surface, (d) side surfaces disposed opposite to each other into which the light from said display means does not enter, and (e) first positioning portions for positioning said first optical element, said first positioning portions being provided on said side surfaces; and a second optical element including (a) a fourth surface into which light from the outer world enters, said fourth surface being a rotary asymmetrical aspherical surface, (b) a fifth surface which has substantially a same shape as that of said third surface, and into which light from the outer world passing through said fourth surface enters, (c) side surfaces disposed opposite to each other into which the light from the outer world does not enter, and (d) second positioning portions for positioning said second optical element, said second positioning portions being provided on said side surfaces, wherein said first optical element and said second optical element are positioned by said first positioning portions and said second positioning portions, with said third surface and said fifth surface faced toward each other, and wherein the light from the outer world passes through said third surface and said second surface in that order after passing through said fifth surface.

51. A combination optical element, comprising:

a first optical element including (a) a first surface into which light from a first image enters, (b) a second surface for totally reflecting light passing through said first surface, (c) a third surface for re-reflecting a part of light totally reflected from said second surface to said second surface, at least one of said first surface, said second surface, and said third surface being a curved surface, wherein at least one of said first surface, said second surface, and said third surface includes an optical effective area for effecting an optical action of the respective surface, and (d) first positioning portions for positioning said first optical element, said first positioning portions being provided at areas of at least one of said first surface, said second surface, and said third surface other than the optical effective area of the respective surface; and a second optical element including (a) a fourth surface into which light from a second image enters, said fourth surface being a rotary asymmetrical aspheric surface, (b) a fifth surface which has substantially a same shape as that of said third surface, and into which light from the second image passing through said fourth surface enters, wherein said fifth surface has an optical effective area for effecting an optical action of said fifth surface, and (c) second positioning portions for positioning said second optical element, said second positioning portions provided at areas of said fifth surface other than the optical effective area of said fifth surface, wherein said first optical element and said second optical element are positioned by said first positioning portions and said second positioning portions, with said third surface and said fifth surface faced toward each other, and wherein the light from the second image passes through said third surface and said second surface in that order after passing through said fifth surface.

52. An observation system, comprising:

display means for displaying an image;

a first optical element including (a) a first surface into which light from said display means enters, (b) a second surface for totally reflecting light passing through said first surface, (c) a third surface for re-reflecting a part of light totally reflected from said second surface to said second surface, at least one of said first surface, said second surface, and said third surface being a curved surface, wherein said third surface has an optical effective area for effecting an optical action of said third surface, and (d) first positioning portions for positioning said first optical element, said first positioning portions being provided at areas of said third surface other than the optical effective area of said third surface; and a second optical element including (a) a fourth surface into which light from the outer world enters, said fourth surface being a rotary asymmetrical aspherical surface, (b) a fifth surface which has substantially a same shape as that of said third surface, and into which the light from the outer world passing through said fourth surface enters, wherein said fifth surface has an optical effective area for effecting an optical action of said fifth surface, and (c) second positioning portions for positioning said second optical element, said second positioning portions being provided at areas of said fifth surface other than the optical effective area of said fifth surface, wherein said first optical element and said second optical element are positioned by said first positioning portions and said second positioning portions with said third surface and said fifth surface faced toward each other, and wherein the light from the outer world passes through said third surface and said second surface in that order after passing through said fifth surface.

53. A prism element according to claim 42, comprising three of said positioning portions.

54. An optical element according to claim 1, wherein said third surface is a rotary asymmetrical aspheric surface.

55. An observation system according to claim 6, wherein said third surface is a rotary asymmetrical aspheric surface.

56. A combination optical element according to claim 8, wherein said third surface is a rotary asymmetrical aspheric surface.

57. An observation system according to claim 13, wherein said third surface is a rotary asymmetrical aspheric surface.

58. An optical element according to claim 15, wherein said third surface is a rotary asymmetrical aspheric surface.

59. An observation system according to claim 19, wherein said third surface is a rotary asymmetrical aspheric surface.

60. A combination optical element according to claim 21, wherein said third surface is a rotary asymmetrical aspheric surface.

61. An observation system according to claim 31, wherein said third surface is a rotary asymmetrical aspheric surface.

62. A prism element according to claim 33, wherein said third surface is a rotary asymmetrical aspheric surface.

63. A prism element according to claim 42, wherein said third surface is a rotary asymmetrical aspheric surface.

64. A combination optical element according to claim 49, wherein said third surface is a rotary asymmetrical aspheric surface.

65. An observation system according to claim 50, wherein said third surface is a rotary asymmetrical aspheric surface.

66. A combination optical element according to claim 51, wherein said third surface is a rotary asymmetrical aspheric surface.

67. An observation system according to claim 52, wherein said third surface is a rotary asymmetrical aspheric surface.

68. An optical element comprising:

a first surface;

a second surface;

a third surface, at least one of said first surface, said second surface, and said third surface being a curved surface, and at least one of said first surface, said second surface, and said third surface being a reflecting surface;

side surfaces disposed opposite to each other; and positioning portions for positioning said optical element, said positioning portions being provided on said side surfaces, wherein said positioning portions comprise projections which are formed at a time of injection molding of said optical element, and wherein said third surface is a rotary asymmetrical aspheric surface.

* * * * *

UNITED STATES PATENT AND TRADEMARK OFFICE
CERTIFICATE OF CORRECTION

PATENT NO. : 6,049,429
DATED : April 11, 2000
INVENTOR(S) : Toshimi Iizuka, et al.

It is certified that error appears in the above-identified patent and that said Letters Patent is hereby corrected as shown below:

Title page,
Item [30] Foreign Application Priority Data
"7-183955" should read -- 8-183955 --.

Item [54],
Title "ELEMENT COMBINATION" should read -- ELEMENT, COMBINATION -- .

Column 1,
Line 1, "ELEMENT COMBINATION" should read -- ELEMENT, COMBINATION --.

Column 2,
Line 6, "aberration" should read -- aberrations --.

Column 4,
Line 16, "ares" should read -- areas --.
Line 35, "fist" should read -- first --.

Column 5,
Line 1, "anther" should read -- another --.

Column 6
Line 27, "id" should read -- 1d --.

UNITED STATES PATENT AND TRADEMARK OFFICE
CERTIFICATE OF CORRECTION

PATENT NO. : 6,049,429
DATED : April 11, 2000
INVENTOR(S) : Toshimi Iizuka, et al.

It is certified that error appears in the above-identified patent and that said Letters Patent is hereby corrected as shown below:

Column 7,
Line 52, "such as" should be deleted.

Column 15,
Line 40, "optical," should read -- optical --.

Signed and Sealed this

Thirteenth Day of November, 2001

Attest:

*Nicholas P. Godici*

NICHOLAS P. GODICI
*Attesting Officer*  *Acting Director of the United States Patent and Trademark Office*